(No Model.)

L. H. JENKS.
VALVE.

No. 487,673. Patented Dec. 6, 1892.

WITNESSES:
Gustave Dieterich
William Miller

INVENTOR:
Llywellynn Howard Jenks
BY
Van Santvoord & Hauff
ATTORNEYS.

UNITED STATES PATENT OFFICE.

LLYWELLYNN HOWARD JENKS, OF NEW YORK, N. Y.

VALVE.

SPECIFICATION forming part of Letters Patent No. 487,673, dated December 6, 1892.

Application filed June 30, 1892. Serial No. 438,554. (No model.)

*To all whom it may concern:*

Be it known that I, LLYWELLYNN HOWARD JENKS, a citizen of the United States, residing at New York, in the county and State of New York, have invented new and useful Improvements in Valves, of which the following is a specification.

The object of this invention is to provide a novel, simple, and effective device for preventing a valve—such, for instance, as an inverted suction-valve—which closes inwardly into its seat from dropping out when the same becomes accidentally detached from its stem, said device being applicable, for instance, to the suction or induction valves in the compressors of refrigerating or ice-making machines, where the valve, if it becomes accidentally detached is drawn into the compressor and is liable to produce serious injury to the machinery.

Figure 1:
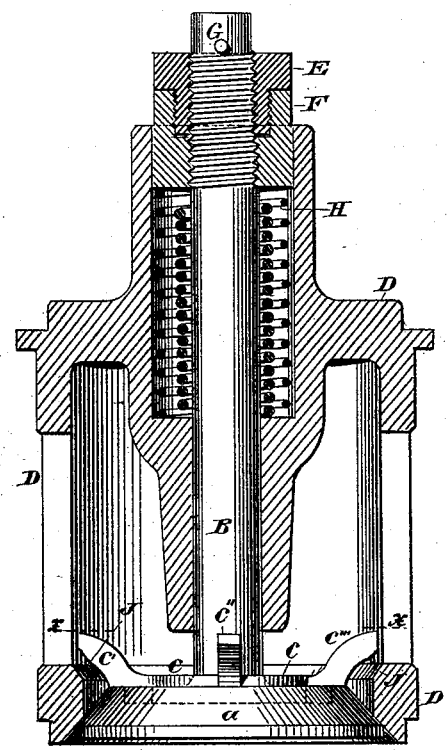
Figure 4:
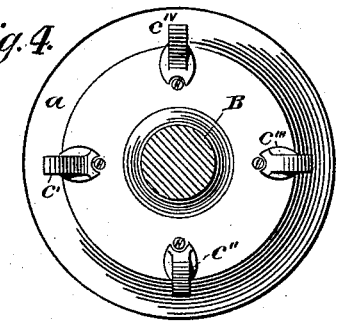
Figure 3:
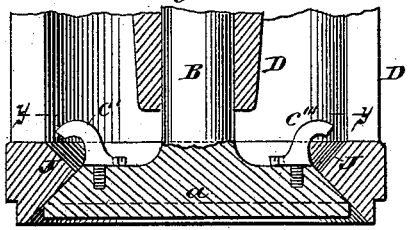
Figure 2:
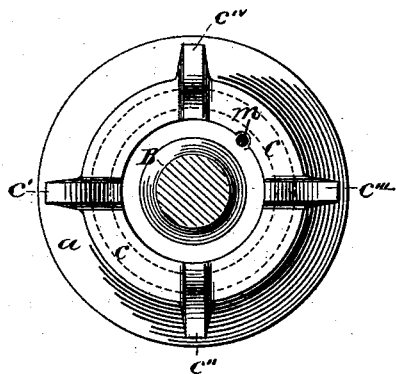

In the accompanying drawings, Figure 1 represents a vertical central section of a valve-chamber containing a valve constructed according to my invention. Fig. 2 is a horizontal section in the plane $xx$, Fig. 1. Fig. 3 is a vertical central section of a modification. Fig. 4 is a horizontal section in the plane $yy$, Fig. 3.

Heretofore certain safety devices have been in use with the view to reach the results which are obtained by my invention; but all such devices have been confined to nuts, locknuts, or other fasteners on the stem of the valve and to means for preventing these nuts from unscrewing. For example, the stem B, Fig. 1, is sometimes pierced above the nut E for the reception of split pins or keys G, or the nut E is held by a set-screw or by the combination of key and set-screw. Such devices are entirely ineffective if the stem of the valve be fractured anywhere below the nut or locking device, such locking devices being unable to prevent the disk of the valve from falling or being drawn into the compressor or pump to the injury or destruction of the same.

In the accompanying drawings the letter $a$ designates the valve-disk.

B is the valve-stem.
D is the frame or cage.
E is the nut, and F is the lock-nut.
H is a spring, which acts to close the valve.
G is a key, which prevents the nut E from unscrewing.

For the purpose of preventing the valve-disk from dropping down when the stem becomes loose or fractured I provide a stop, which is secured to the valve-disk and extends beyond its circumference, so that it is adapted to engage a lip or shoulder formed in the frame or cage D. In the example shown in Figs. 1 and 2 this stop consists of the plate $c$, which is secured in the body of the valve-disks, and from which project four lugs $c'$ $c''$ $c'''$ $c^{IV}$. When the valve-disk drops down, these lugs engage a shoulder J formed in the frame or cage D. The plate $c$ enters a cavity in the valve-disk and is held in place by one or more set-screws $m$, Fig. 2, so that the same, together with the lugs $c'$ $c''$ $c'''$ $c^{IV}$, can be readily removed whenever it is desirable.

In the example shown in Figs. 3 and 4 the lugs $c'$ $c''$ $c'''$ $c^{IV}$ are made detached from each other, each lug being provided with a screw-stem, which engages a screw-socket in the valve-disk, so that said lugs can be readily taken out whenever it is desirable, the cage D being open to give access to the lugs.

What I claim as new, and desire to secure by Letters Patent, is—

The combination, with an open frame or cage D and with a valve adapted to close inwardly against a seat formed in the cage, of a shoulder J, formed in the cage in juxtaposition to the valve-seat, and a lug or stop removably secured in the valve-disk and adapted to engage said shoulder, substantially as described.

In testimony whereof I have hereunto set my hand in the presence of two subscribing witnesses.

LLYWELLYNN HOWARD JENKS.

Witnesses:
WM. C. HAUFF,
E. F. KASTENHUBER.